United States Patent [19]

Lambertz et al.

[11] Patent Number: 4,695,789
[45] Date of Patent: Sep. 22, 1987

[54] PROBE DEVICES

[75] Inventors: Johannes Lambertz, Kerpen; Ingo Schumacher, Cologne, both of Fed. Rep. of Germany

[73] Assignee: Rheinische Braunkohlenwerke AG., Fed. Rep. of Germany

[21] Appl. No.: 755,405

[22] Filed: Jul. 16, 1985

[30] Foreign Application Priority Data

Jul. 21, 1984 [DE] Fed. Rep. of Germany ....... 3426993

[51] Int. Cl.[4] ............................................. G01F 23/28
[52] U.S. Cl. ................................. 324/61 P; 73/304 C
[58] Field of Search ............... 340/603, 612, 617, 620; 73/304 R, 304 C; 324/72.5, 158 P, 73 R, 446–449, 457, 61 R, 61 P, 65 P

[56] References Cited

U.S. PATENT DOCUMENTS

| | | | |
|---|---|---|---|
| 3,445,766 | 5/1969 | Valliere | 324/72.5 |
| 4,086,528 | 4/1978 | Walton | 73/304 C |
| 4,278,934 | 7/1981 | Ihara | 324/61 P |
| 4,350,040 | 9/1982 | Fasching | 324/61 P |

FOREIGN PATENT DOCUMENTS

| | | | |
|---|---|---|---|
| 84405 | 7/1983 | European Pat. Off. | |
| 1084495 | 6/1960 | Fed. Rep. of Germany | 324/65 P |

*Primary Examiner*—Reinhard J. Eisenzopf
*Assistant Examiner*—Jose M. Solis
*Attorney, Agent, or Firm*—Panitch Schwarze Jacobs and Nadel

[57] ABSTRACT

A probe device comprises a two-channel capacitive measuring sensor together with two further single-channel capacitive measuring sensors so disposed that the tips of the sensors are disposed in a common horizontal plane, the sensors being operable to detect the position and speed of movement of an interface between first and second phases in a system made up of at least two phases, such as a gas-solids fluidized bed. The data obtained when the probe is contacted by a gas bubble in the fluidized bed serve as the basis for them ascertaining the condition of and thus the reaction procedure taking place in the bed.

8 Claims, 6 Drawing Figures

PROBE DEVICES

BACKGROUND OF THE INVENTION

There are a number of technological situations involving a system made up of a plurality of media having different dielectric constants, wherein there is a need to determine the presence and the speed of propagation of one of the media in the system. In certain circumstances, such media form phases which have interfaces with each other. Thus, an example of such a system comprising a plurality of media is a gas-liquid system, -for example carbon dioxide gas dissolved in mineral water. The gas in that system forms bubbles of approximately spherical shape and of substantially equal size, which move through the water. In such a situation, there may be a need to detect the presence of the gas bubbles and to measure the speed of propagation thereof, that is to say, the speed at which the bubbles rise through the liquid and escape at the surface thereof. The detection and measurement operation can be effected by means of a suitable probe which includes capacitive measuring sensors. One such form of sensor, which is carried in a suitable holder, comprises electrical conductors which are disposed in parallel and approximately coaxial relationship at a spacing within a third cylindrical, hollow conductor and which have tips terminating outside the hollow conductor at an axial spacing from each other, to act as a capacitive measuring sensing means. When the probe is used in a gas-liquid system for the purposes of detecting the presence and measuring the speed of propagation of the gas in the liquid, a gas bubble which encounters the axially outward tip of the capacitive measuring sensor results in the generation of a first electrical signal; when it encounters the second tip which is at an axial spacing from the first tip, a second electrical signal is produced. The speed at which the gas is moving upwardly in the liquid such as water in the system is measured from the predetermined axial spacing between the two tips of the conductors and the measured difference in time between impingement of the gas bubble on the first and second tips.

Such probes may be used in particular for carrying out measurement operations in technical systems as in reactors in which gases react with oil or in fluidised beds in which gases or liquids react with solid materials which are in suspension in the bed. Various probes have been proposed for the purposes of carrying out measurements in gas liquid systems, but such probes are not adequate when dealing with gas solid material fluidised beds for the purposes of drawing conclusions about and obtaining information concerning the course of the reaction in the fluidised bed. With regard to the difficulties involved in describing a gas-solid fluidised bed, attention is direction to the article by Joachim Werther: 'Mathematische Modellierung von Wirbelschichtreaktoren' (translation: Mathematical Modelling of Fluidised Red Reactors) (in Chem.-Ing. Tech. 50 (1978) No 11, pages 850-860).

In accordance therewith, a gas solid fluidised bed is considered as consisting of two phases, namely the bubble phase and the suspension phase surrounding the bubbles. The gas in the bubbles circulates in the interior of the bubbles or in a thin layer of particles forming the wall of the respective bubble, and forms a volume which is closed off from its surroundings. The particles of the solid matter come together to form aggregates and, when that happens, as a result of aggregate formation, the bubbles are formed between the aggregates as hollow spaces which are almost free of solid material therein and which are of different sizes, while being of approximately the same configurations. The formation of such bubbles not only affects the gas-solid material contact but also influences the heat exchange as between the fluidised bed and the heating or cooling surfaces, as well as the mixing of the solid material within the fluidised bed. In spite of a number of advances which have been made in detail matters, it has not hitherto been possible to arrive at reliable calculations in respect of fluidised bed reactors. The development of novel fluidised bed processes, as well as further developments in already existing fluidised bed processes, are still proceeding essentially on an experimental basis.

SUMMARY OF THE INVENTION

An object of the present invention is to provide a probe for efficiently carrying out measurement operations in technical systems made up of a number of media.

Another object of the present invention is to provide a probe for supplying information regarding a reaction procedure in a system involving a reaction between a number of components.

Yet another object of the present invention is to provide a probe for effectively determining the presence and speed of propagation of one medium in another medium of a system by means of sections taken from an approximately known geometrical form at any points in an interlace between the phases involved.

Still another object of the present invention is to provide a probe adapted effectively to detect reaction conditions in a fluidised bed situation.

A further object of the present invention is to provide a probe arrangement which is capable not only of performing measurement operations in a fluidised bed reactor but also performing measuring operations in respect of agents or media flowing in a conduit.

According to the present invention, those and other objects are attained by means of a probe which is disposed in a suitable holder and which has two separate electrical conductors. The electrical conductors are initially in a substantially parallel and approximately coaxial relationship at a spacing within a third hollow conductor which is for example preferably cylindrical. The first and second electrical conductors have tips which terminate outside the third conductor at an axial spacing from each other as capacitive measuring sensing means in a common ceramic casing or sheath, for determining the presence and the speed of propagation of a medium in a system consisting of a plurality of media with different dielectric constants, which in certain conditions form phases which have interfaces with each other. Two further capacitive measuring sensing means, each having a single coaxial inner electrical conductor, are so arranged in the above-mentioned holder that the arrangement provides three tips which are arranged in a triangular configuration, in a common plane.

As will be seen in greater detail hereinafter in the description of a preferred embodiment of such a probe, besides detecting and measuring the presence and the speed of propagation or the rate of upward movement of a gas bubble in for example in a fluidised bed, the probe can also be used to determine the size of the gas bubble. On the basis of the number of gas bubbles detected in the measuring cross-section of a reactor, the speed of the gas bubbles and the respective sizes thereof, it will be possible to ascertain the condition of the fluidised bed and thus to obtain information about the reaction procedure taking place therein. The condition of the fluidised bed in turn is a measurement in respect of the material exchange which is occurring in the fluidised bed. Besides the possibility of carrying out measurement operations in a fluidised bed reactor, the probe according to the invention also makes it possible for example to carry out measurement operations in respect of media flowing in a conduit.

For the purposes of making measurements in a fluidised bed reactor for example, it is advantageous for the axially outward tips of the capacitive measuring sensors to be disposed in a common horizontal plane. In comparison with a possible arrangement wherein the axially outward tips of the two additional measuring sensors referred to above are disposed in a plane with the axially inward tip of the first mentioned measuring sensor with the first, second and third electrical condutors, the arrangement in accordance with this preferred feature of the invention affords the advantage that the arrangement is easier and therefore less expensive to produce. In order to achieve a high level of measuring accuracy, it is necessary for the tips of the measuring sensors to be disposed in the common plane with tolerances which are as small as reasonably possible.

In a construction in accordance with the teachings of the present invention, which has been found to be particularly advantageous, the outer tips of the measuring sensors are disposed at the corners of a notional, substantially equilateral triangle. When a gas bubble impinges against the probe assembly, that arrangement detects a triangular portion of the surface of the gas bubble. As the gas bubble is approximately in the configuration of a rotationally symmetrical, ellipsoidal or spherical body, the three tips of the measuring sensors of the probe assembly are generally not touched by the surface of the gas bubble all at the same time. On the basis of the differences in time between the moment of contact of the individual sensing tips, and by means of the speed of movement of the bubble which is detected at the first-mentioned measuring sensor comprising the first, second and third conductors, the probe assembly according to the invention is finally capable of ascertaining the position in space of the notional triangle defined by the points of contact of the tips of the measuring sensors with the surface of the gas bubble. By means of for example a computer, the size of the bubble is calculated from the position in space of the triangular portion of the surface of the bubble when the tips of the probe penetrate thereinto, and the distance away or the position in space of the opposite triangular portion of the surface of the bubble when the tips of the probe come out of the bubble again.

As the shapes and in particular the sizes of bubbles may be different in different gas-solid fluidised beds, another advantageous feature of the invention provides that the distance between the tips of the capacitive measuring sensors, with a predetermined degree of measuring accuracy, is established in dependence on the speed of propagation of the one medium, for example in the present situation the gaseous medium. Establishing the distance between the sensor tips in that way also constitutes the degree of resolution of the assembly, and that also depends on the nature and size of the computer which is connected to the probe arrangement and which is required for ascertaining the size of the bubbles in the system.

In most cases and under normal circumstances, it is usually sufficient to detect a substantially flat triangular portion from the surface of a bubble, which is curved per se, by means of the tips of the capacitive measuring sensors which are disposed in a common plane, and from that to calculate back to the size of the bubble, from the position in space of the triangular portion of the surface of the bubble detected by the sensor assembly. In some special circumstances however it may be advantageous also to detect the curvature of the surface of the bubble, besides the triangular portion defined by the arrangement of the tips of the measuring sensors. In accordance with a further feature of the invention therefore, a further additional single-channel measuring sensor is disposed substantially at the centre point of the triangular array defined by the first three measuring sensors.

It is also advantageous if the probe, together with its holder, can be successively disposed at various points, within the area of a cross-section for example in a fluidised bed reactor. In accordance with a further feature of the invention therefore, the holder may be axially displaceably disposed at the boundary of the measuring cross-section, such boundary being formed for example by the wall of a reactor or a tube or the like. By means of simple arrangements which are known per se, the holder for the probe is secured to the above-mentioned boundary of the measuring cross-section in such a way that, as required and together with the measuring sensors, it can be disposed at different positions in the measuring cross section.

Further objects, features and advantages of the present invention will be apparent from the following description of a preferred embodiment of the probe arrangement which is suitable for investigating the bubbles in a gas-solid fluidised bed, as an example of use thereof.

DESCRIPTION OF THE PREFERRED EMBODIMENT

Reference will now be made to the drawings showing a probe according to the invention in the situation of detecting the presence and determining the speed of propagation of bubbles in a gas-solid fluidised bed situation.

Figure 1:
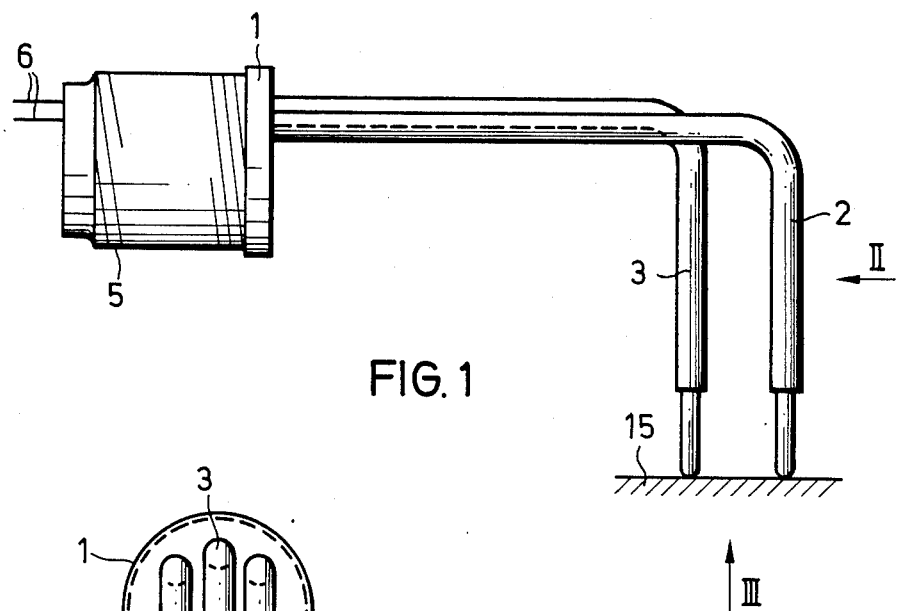
FIG. 1 is a side view of a holder with a probe arrangement carried thereby.
Figure 2:
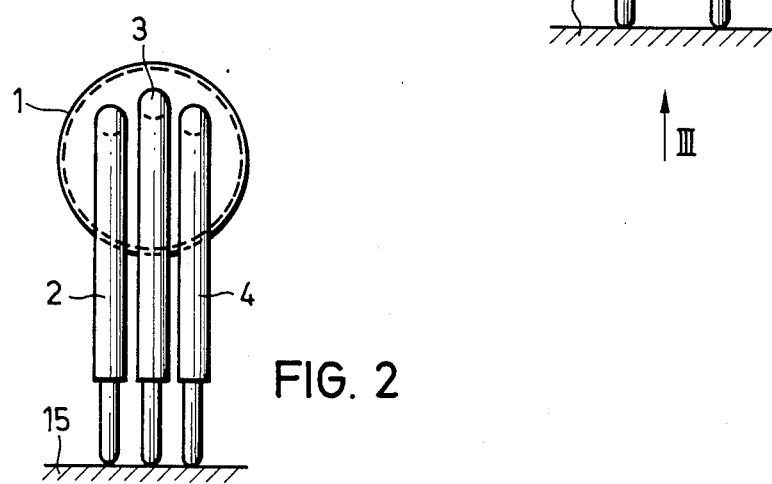
FIG. 2 is a front view of the probe arrangement shown in FIG. 1, as viewed in direction II in FIG. 1.
Figure 3:
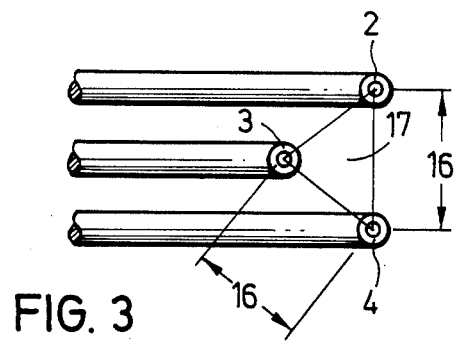
FIG. 3 shows a plan view of the measuring sensors of the probe as viewed in the direction indicated by III in FIG. 1.

Referring firstly to FIGS. 1 and 2, the probe in accordance with the invention comprises a holder 1 in which three capacitive measuring sensors 2, 3 and 4 are secured, in the configuration illustrated in FIGS. 1 and 2. Referring in addition now to FIG. 3, the measuring sensors 2, 3 and 4 are arranged in the holder 1 in the form of a substantially equilateral triangle, that is to say, the tips of the respective measuring sensors 2, 3 and 4 define the respective apexes of a notional triangle.

As can be clearly seen from FIG. 2, the holder 1 is of a substantially cylindrical cross-section, with the circumferential surface thereof being provided with an outside screwthread as indicated at 5 in FIG. 1 so that it can be screwed into the boundary of a measuring section (not shown), for example into the wall of a reactor. In that connection, it is possible for the means for fixing the holder in the boundary of the measuring section to include intermediate members (not shown) so that the holder can be successively disposed at different positions in the measuring section, by axial displacement thereof, by way of the use of varying intermediate members. At its rearward end, being therefore the end which is towards the left in FIG. 1, the holder 1 has connections or terminals 6 for making electrical connections to the respective measuring sensors.

Figure 5:
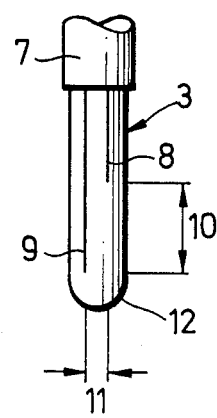
FIG. 5 shows the tip of a two channel probe.

Referring now to FIG. 5, the capacitive measuring sensor 3 is of a configuration which is known per se and which is referred to herein as a two-channel measuring sensor. Thus, the measuring sensor 3 comprises a hollow electrical conductor 7 which, in the embodiment illustrated, is in the form of an elongate hollow cylinder. Disposed at a spacing from the conductor 7 and inside same in approximately coaxial relationship are two electrical conductors 8 and 9 which terminate at an axial spacing from each other, as indicated by reference 10 in FIG. 5. As can be clearly seen from FIG. 5, the conductors 8 and 9 are not in contact with each other, but on the contrary they are passed through the outer conductor 7 at a spacing from each other as indicated at 11 in FIG. 5. The spacing 11 is as small as reasonably possible in order to minimise the error which is caused by the inclined position in space in which a portion of the surface of a bubble of gas impinges on the measuring sensor 3. The axial ends of the two conductors 8 and 9 are embedded in a ceramic sleeve or sheath which forms a blunt tip as indicated at 12.

Figure 4:
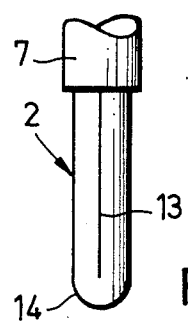
FIG. 4 shows the tip of a single-channel probe.

The measuring sensors 2 and 4 are of a similar configuration to the measuring sensor 3, FIG. 4 showing for example the measuring sensor 2. In the case of the measuring sensors 2 and 4, a preferably cylindrical hollow electrical conductor 7 surrounds a single middle conductor 13 which is disposed in coaxial relationship therewith and which is embedded in a ceramic sleeve or casing forming a blunt tip 14. The measuring sensors 2 and 3, with just the single central conductor 13, from what are referred to herein as single-channel measuring sensors.

When an electrical voltage is applied between the conductor 7 and a respective one of the conductors 8, 9 or 13, an electrical field is produced between the conductor 7 and the respective conductor 8, 9 or 13. The electrical field changes as soon as the medium, being a dielectric, around the measuring sensor 2, 3 or 4 alters. The change in the electrical field is taken off in the form of an electrical signal at the terminals 6 which are appropriately connected to the respective conductors of each measuring sensor. A single electrical signal is taken off at a respective one of the measuring sensors 2 or 4, upon each change in the medium whereas in the case of the measuring sensor 3, upon each change in the medium, the sensor produces two electrical signals which differ in respect of time from each other. It is for that reason that the measuring sensors 2 and 4, which produce a single signal, are referred to as a single-channel measuring sensor whereas the measuring sensor 3 which produces two signals is referred to as a two-channel sensor.

The two signals produced at the measuring sensor are generated when the dielectric encounters on the one hand the outward axial end of the conductor 9 and on the other hand the inward axial end of the conductor 8. The difference between the times at which those two electrical signals are generated is ascertained as the time which the dielectric material requires to pass through the space 10. The quotient from the predetermined spacing 10 and the measured interval of time is a measurement in respect of the speed at which the other dielectric is covering the distance 10. It the distance 11 between the two conductors 8 and 9 is small, then the level of error which arises out of the form of the medium contacted by the respective conductors 8 and 9 is low.

The tips 12 and 14, more particularly the ends of the axial conductors 9 and 13, are disposed in a substantially common horizontal plane 15, as shown in FIG. 1. As shown in FIG. 3, the tips are arranged in the form of a notional substantially equilateral triangle, with the equal spacings between the tips being indicated by reference 16. If necessary, the arrangement may be supplemented by a fourth measuring sensor as indicated schematically by reference numeral 17 in FIG. 3, arranged at the centre point of the notional triangle defined by the tips of the measuring sensors. The tip of the fourth measuring sensor also terminates in the common horizontal plane 15.

Figure 6:
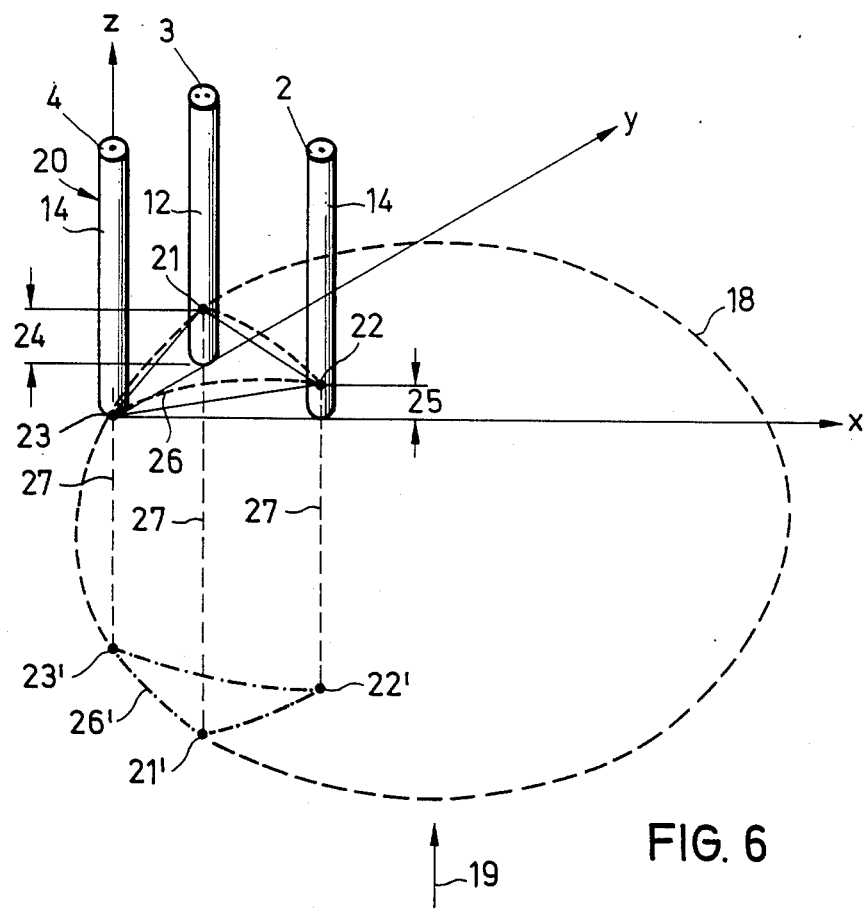
FIG. 6 shows the mode of operation of the probe on a model.

Reference will now be made to FIG. 6 which is a simplified diagrammatic view of a gas bubble indicated generally by reference numeral 18, which moves at a speed as indicated by the arrow 19 through a reaction space, for example a gas-solid fluidised bed, which is illustrated in perspective form by the cartesian co-ordinates x-y-z. The gas bubble 18 rises in a solids suspension (not shown) which is formed for example by the particles of carbon which are gasified within a fluidised bed gasifier. Disposed in the space x-y-z is a probe indicated generally at 20, which has the two single channel capacitive measuring sensors 2 and 4 and the two-channel capacitive measuring sensor 3. The probe 20 corresponds to the construction described above with reference to FIGS. 1 to 5, although it will be appreciated that FIG. 6 only shows the tips 12 and 14.

It will firstly be assumed that the bubble 18 is of a form which can be mathematically ascertained, for example being in the form of a sphere, an ellipsoid or a rotationally symmetrical body, and that as it moves in the direction indicated by the arrow 19, it encounters the probe 20, with some part of the surface of the gas bubble. When the gas bubble encounters the probe 20, the tips 12 and 14 thereof successively pass through the surface of the bubble 18, which is shown in broken lines, at the points indicated by references 21, 22 and 23. While the tip 12 is first to pass through the surface 18 of the bubble at point 21, followed by the tip 14 which passes through the surface 18 of the bubble at point 22, with finally the tip penetrating the bubble surface at point 23, there are the distances 24 and 25 in space, in a vertical direction z, between the individual contacts between the tips 12 and 14 and the surface 18 of the bubble, at the points 21, 22 and 23. Corresponding to the arrangement of the tips 12 and 14, the contact points 21 through 23 form a notional trangle which, in accordance with the different distances 24 and 25, occupies an inclined position in the space x y-z. As the point 21 of the surface of the bubble successively meets the axial ends of the conductors 9 and 8 in the measuring sensor 3, the magnitude of the distances 24 and 25 are ascertained from the time difference which is measured thereby, thereby also giving the inclined position of the triangular surface defined between the points 21, 22 and 23.

As it moves through the space x y-z, the surface of the bubble then comes into contact with the probe 20 at the points 21', 22' and 23' of the surface of the bubble, which are disposed in mirror image relationship to and beneath the points 21, 22 and 23 at which the bubble surface first encountered the probe. On the basis of the data of at least one of the distances as indicated at 27 between the respective points 21-21', 22-22' and 23-23', the size of the bubble 18 is finally ascertained as by means of a computer. In that connection, account is taken of the fact that the points 21 through 23' are possibly encountered by the tips 12 and 14 in the opposite sequence to that with which the points 21 to 23 encountered the tips of the probe.

Depending on the magnitude of the distances 24 and 25 detected, the points 21, 22 and 23 may be at different spacings from each other, which are unequal to the spacings 16 between the tips 12 and 14. The deviation arises out of the inclined position of the notional triangular portion defined on the surface of the bubble of gas, in space. In most cases, the level of measuring accuracy is adequate if the triangular portion defined on the surface 18 of the bubble of gas, between the points 21 through 23, is considered to be flat. For measurements with a particularly high degree of accuracy however, it may be necessary also to ascertain the curvature of the triangular surface portion, as indicated by way of example by the broken lines 26 and 26' in FIG. 6. In that case, in order to ascertain the curvature of the triangular portion defined between the tips of the probe 20, the probe arrangement includes a fourth capacitive measuring sensor disposed at the position indicated at 17 in FIG. 3, at the centre of the triangular configuration defined by the measuring sensors 2, 3 and 4.

The above-described probe in accordance with the principles of the present invention may be used to carry out measurements on gas-solid fluidised beds, from which measurements, the amount of gas in the solids suspension in the fluidised bed is determined, at given selected points therein. More extensive information regarding the reaction procedure within a fluidised bed reactor may be obtained by means of the present invention, by way of the known possibilities of calculating material exchange at phase boundaries or interfaces.

It will be seen therefore that the present invention makes it possible, in a system comprising a plurality of media or materials, to obtain information about the reaction phenomena in the system, besides ascertaining the presence and the speed of propagation of one medium in another medium in the system, by means of portions taken from an approximately known geometrical form, which are obtained at any points on an interface between the two phases. It will be appreciated therefore that the above-described embodiment of the probe was set forth only by way of example in relation to use in a system comprising a gas-solid fluidised bed wherein the one medium moving through another medium was gas in the form of bubbles, with portions from the surface thereof being used to obtain information about the proceedings within the fluidised bed.

It will be appreciated that various modifications and alterations may be made in the above described construction according to the present invention without departing from the spirit and scope thereof.

What is claimed is:

1. A probe device including a holder, a first capacitive measuring sensor carried by the holder and comprising a first hollow electrical conductor, and second and third mutually separate electrical conductors which are disposed in at least substantially parallel and approximately coaxial relationship within the first conductor and which have tips terminating outside the first conductor at an axial spacing from each other in a common ceramic casing adapted for detecting the presence and the speed of propagation of a first medium in a system comprising a plurality of media with different dielectric constants which in certain states form phases having interfaces with each other, and second and third further capacitive measuring sensors each having a respective single coaxial inner conductor, the sensors being so arranged in the holder that the three tips thereof lie in a common plane and are disposed in a triangular configuration.

2. A probe device including: a holder; a first capacitive measuring sensor carried by said holder and comprising a first hollow electrical conductor, and second and third mutually separate electrical conductors which are disposed in at least substantially parallel and approximately coaxial relationship within the first conductor and which each provide tip portions terminating outside the first conductor at an axial spacing from each other, and a sheathing means enclosing said tip portions, said first sensor being adapted to determine the presence and speed of propagation of a medium in a system comprising a plurality of media with different dielectric constants which in certain states form phases having interfaces with each other; and second and third capacitive measuring sensors each carried by said holder and each comprising a first hollow electrical conductor, a single inner electrical conductor which is disposed in the respective said first conductor in at least substantially coaxial relationship therewith and which provides a tip portion terminating outside the respective said first conductor, and a sheathing means enclosing the respective said single conductor; said first, second and third sensors being so arranged that the tips of said sensors are disposed at least substantially in a common plane and are arranged in a triangular configuration.

3. A probe device as ILLEGIBLE ILLEGIBLE or use the axially outward tips of said sensors are disposed in a common horizontal plane.

4. A probe device as set forth in claim 2 wherein said tips of said sensors are arranged at the apexes of an at least substantially equilateral triangle.

5. A probe device as set forth in claim 2 wherein the mutual spacing of the tips, for a given degree of measuring accuracy, is established in dependence on the speed or propagation of said first medium.

6. A probe device as set forth in claim 2 and further including a fourth capacitive measuring sensor at the centre of the triangular configuration defined by said three tips.

7. A probe device as set forth in claim 2 and further including means for mounting said holder at a boundary of a measuring cross section, displaceably in the axial direction of said holder 8. A probe device including: a first measuring sensor comprising a first at least substantially cylindrical, hollow electrical conductor, second and third electrical conductors which are disposed in at least substantially parallel relationship with each other and which each have a first portion disposed within said first conductor and a second portion extending out of said first conductor, said second portions of said second and third conductors providing tips which terminate outside said first conductor at an axial spacing from each other whereby said second conductor extends out of said first conductor to a greater distance than said third conductor, and a ceramic casing means enclosing said second portions of said second and third conductors; and second and third measuring sensors each of which includes a first at least substantially cylindrical, hollow conductor, a second conductor which is disposed in at least substantially coaxial relationship with the respective said first conductor and which has a first portion within the respective said first conductor and a second portion extending therefrom to provide a tip, and a ceramic casing means enclosing said second portion of the respective said second conductor of each of said second and third measuring sensors, the tips of said second portions of said second conductors of each of said second and third measuring sensors and the tip of the longer second portion of said second conductor of said first measuring sensor being so arranged that they are disposed substantially in a common plane and define a triangular configuration in said plane.

* * * * *